United States Patent [19]

Jefferson

[11] 4,437,455

[45] Mar. 20, 1984

[54] STABILIZATION OF SOLAR FILMS AGAINST HI TEMPERATURE DEACTIVATION

[75] Inventor: Clinton F. Jefferson, Millburn, N.J.

[73] Assignee: Engelhard Corporation, Iselin, N.J.

[21] Appl. No.: 374,448

[22] Filed: May 3, 1982

[51] Int. Cl.³ .............................................. B32B 5/16
[52] U.S. Cl. ................................. 126/417; 126/901;
 427/160; 428/697; 428/469; 350/1.7
[58] Field of Search ......................... 126/417, 450, 901;
 350/1.7; 428/623, 633, 670, 433, 469, 697, 701;
 427/160

[56] References Cited

U.S. PATENT DOCUMENTS

| | | | |
|---|---|---|---|
| 3,176,679 | 4/1965 | Langley | 126/417 |
| 3,978,272 | 3/1974 | Donley | 126/901 |
| 4,150,191 | 4/1979 | Karki | 126/901 |
| 4,156,622 | 5/1979 | Lindmayer | 427/160 |
| 4,211,210 | 7/1980 | Muenker et al. | 428/697 |
| 4,228,220 | 10/1980 | Garrison | 126/901 |
| 4,312,915 | 1/1982 | Fan | 126/417 |
| 4,321,300 | 3/1982 | Farrauto et al. | 428/469 |

*Primary Examiner*—Larry Jones
*Assistant Examiner*—Noah Kamen

[57] ABSTRACT

A multi-layer solar energy collector of improved stability comprising: (1) a solar absorptive film consisting essentially of copper oxide, cobalt oxide and manganese oxide; (2) a substrate of quartz, silicate glass or a stainless steel; and (3) an interlayer of platinum, plus a method for preparing a thermally stable multi-layered solar collector, in which the absorptive layer is undercoated with a thin film of platinum to obtain a stable conductor-dielectric tandem.

16 Claims, 3 Drawing Figures

REFLECTANCE VS. WAVELENGTH FOR $Cu_{0.67}Co_{0.33}Mn_2O_4$ ABSORBER FILMS WITH Pt PRECOAT ON QUARTZ SUBSTRATE BEFORE AND AFTER THERMAL AGING AT 500°C FOR 700 HOURS IN AIR

STABILIZATION OF SOLAR FILMS AGAINST HI TEMPERATURE DEACTIVATION

This invention relates to a multi-coated selective solar energy collector and method for preparation.

More specifically, this invention relates to a solar energy collector in which an absorber film containing copper, cobalt and manganese is undercoated with platinum to form a conductor-dielectric tandem. The resulting collector exhibits marked improvements in solar absorptance and emittance, and improved stability at high temperatures.

BACKGROUND

When radiant energy from the sun strikes a solar collector, some of the energy is reflected or transmitted and lost, and the remainder is either absorbed or re-radiated into the atmosphere. Most of the sun's energy is emitted at wavelengths below 2.0 microns and a substantial amount of such energy is normally re-radiated into the atmosphere at a longer wavelength, such as infrared radiation. It is desirable, therefore, for solar collectors to have a high capacity for energy absorption below 2 microns in combination with low emissivity at the longer wavelengths.

Blackbodies are known to absorb a significant amount of energy in the solar spectrum but, unfortunately, also re-radiate most of that energy in the infrared (IR) spectrum and, therefore, are generally unsatisfactory as collectors.

Preferred absorptive coatings or films, which optimize solar absorptance and inhibit emissivity in the longer wavelengths, are generally known as "selective absorbers". A superior selective absorber should have, for instance, a solar absorptance level ($\alpha$) approaching a value of 1.0 and a thermal emittance or emissivity ($\xi$) approaching zero.

The principal factors affecting absorptance, emittance and thermal stability of solar energy collectors are (1) the physical and chemical properties of the absorptive layer, (2) the nature of the substrate to which they are applied, and (3) the nature and functional properties of the precoat or interlayer between the absorptive component and substrate.

Metals such as silver, copper, gold and aluminum, for instance, have low emissivity but are low absorbers of solar energy and, alone, are not generally useful as solar collectors. They can, however, be incorporated into a selective solar absorber collector as a low emissivity component. In addition, some systems have been found unstable, particularly under vacuum conditions. As a result, there is a rapid deterioration of emissivity properties, and substantial diminishment in the overall efficiency of the collector. At higher temperatures, by way of example, silver films tend to agglomerate. In addition, metal oxide components tend to break down under vacuum to produce the elemental form.

THE INVENTION

Figure 1:
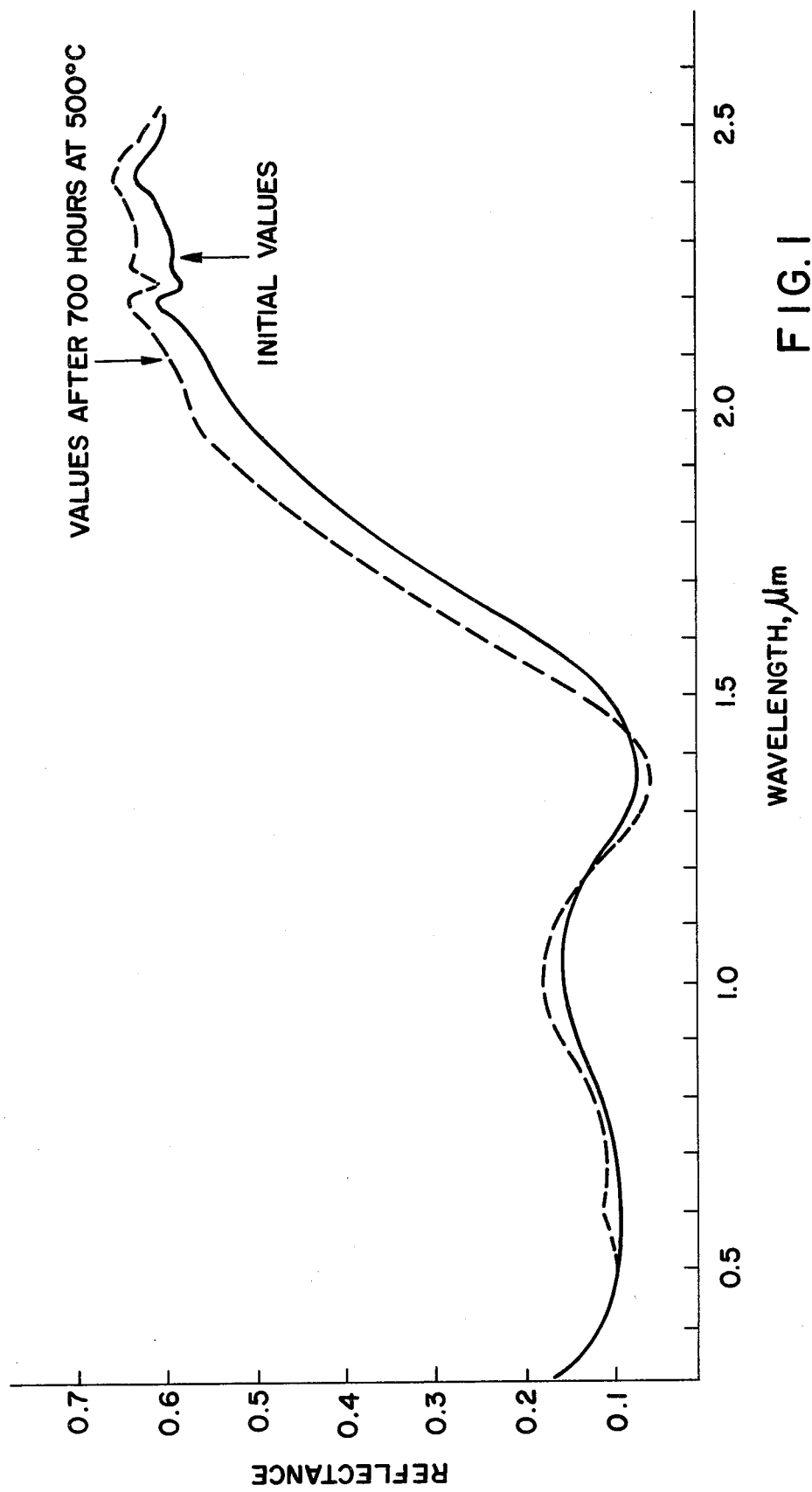
FIG. 1 shows a graph of the Reflectance vs. Wavelength of the present invention before and after 700 hours at 500° C.

One object of this invention is to provide a thin film solar energy collector, which can absorb essentially all of the radiant energy which impinges upon its surface within the wavelength band of about 0.3–2.0 microns. This absorbed energy can then be converted into heat or an electrical current via thermal-electric conversion techniques, provided that it is not otherwise re-radiated into the atmosphere.

The solar collectors of this invention exhibit high absorptivity, low emissivity and a resistance to degradation even under vacuum conditions at temperatures up to about 700° C., inclusive of a useful commercial operating range of about 300° C.–600° C. Such collectors (i.e., the combination of absorptive film and interlayer), are characterized by a conductor-dielectric structure having optical stability at high temperatures, with excellent thermal emittance properties.

Solar energy collectors of improved thermal stability within the scope of this invention comprise, in combination, (a) a substrate component of quartz, silicate glass or a stainless steel, inclusive of aluminum-, chromium-, iron-, and nickel-containing alloys and can also contain minor quantities of other elements, such as cobalt and/or yttrium.

(b) a solar absorptive layer containing an oxide of copper, cobalt, and manganese; such include films represented by the general formula $Cu_{1-x}Co_xMn_2O_4$ over (c) an interlayer or precoat comprising platinum in contact with (a) and (b) to form a tandem structure.

As desired, it is also found useful to apply at least one anti-reflective coating, such as cerium oxide or tantalum oxide, to the absorptive layer to effectively cancel out light reflected from its lower and upper surfaces.

The substrate "(a)" layer of the present invention usefully comprises stainless steel in wrought or cast form, and examples of such substrates within the scope of the present invention include, (all components being represented in weight-percent relationship):

304 Stainless Steel: Mn: 2.0; Cr: 18.20; Ni: 8–10; balance Fe.

316 Stainless Steel: Mn: 2.0; Cr: 15–18; Ni: 10–14; balance Fe.

406 Stainless Steel: Cr: 13, Al: 4.2; Ti: 0.26; balance Fe.

408 Stainless Steel: Mn: 0.3; Cr: 12.03; Ni: 0.2; Al: 1.36; Nb: 0.73; Ti: 0.37; balance Fe.

409 Stainless Steel: Mn: 0.46; Cr: 10.80; Ni: 0.37; Al: 0.085; Ti: 0.43; balance Fe.

439 Stainless Steel: Mn: 0.34; Cr: 18.70; Ni: 0.22; Al: 0.067; Ti: 0.76; balance Fe.

Inconel ®601: Cr: 23; Ni: 61.5; Al: 1.35; balance Fe.

Fecralloy ®: Cr: 15; Al: 5; Y: 0.3; balance Fe.

Kanthal* A-1: Cr: 22; Al: 5; Co: 0.5; balance Fe.

*Trademark of Kanthal Corporation, Sweden.

The solar absorptive "(b)" layer, as above-described, has the ability to absorb large amounts of solar energy having wavelengths of less than 2.0 microns, has a maximum solar absorptance approaching 0.92, and is further characterized by a thermal emittance ranging from 0.06–0.12. More importantly, it is resistant to degradation under vacuum or partial vacuum conditions.

While the interacting functional properties of the components of this solar absorptive layer are not fully known, the stability and efficiency of the solar collectors are enhanced by the tandem combination of the (b) and (c) layer. In general, the copper- and cobalt-oxide components are found to be associated with solar absorption efficiency. The (c) platinum interlayer component, on the other hand, is found to act generally as an infrared reflector (low emittance) which, in combination with copper oxide produces a selective solar absorber with improved vacuum stability. The manganese oxide component is also found to be associated with stabilization of the optical properties of the collector.

Components of the (b) solar absorptive layer within the scope of the present invention are usefully present in a concentration range of about 15%–35% by weight of a copper oxide, 5%–15% by weight of a cobalt oxide, and 50%–80% by weight of a manganese oxide and preferably a layer within concentration ranges of 15%–35% CuO, 10%–15% by weight CoO, and 50%–75% by weight $Mn_2O_3$ respectively.

Of still greater interest are (b) solar absorptive layers utilizing 15%–35% CuO, 5%–15% CoO and 60%–75% $Mn_2O_3$.

Of particular interest are absorptive layers conveniently represented by the general formula $Cu_{0.67}Co_{0.33}Mn_2O_4$.

In each case, however, the (b) component described above, can also include at least one anti-reflective coating, such as cerium oxide or tantalum oxide.

Suitable solar absorptive layers within the present invention include those listed in TABLE I, infra.

TABLE I

| Solar Absorptive Film Compositions (% By Weight) | | |
|---|---|---|
| CuO | CoO | $Mn_2O_3$ |
| 15.0 | 5.0 | 80.0 |
| 15.0 | 15.0 | 70.0 |
| 17.2 | 14.6 | 68.2 |
| 22. | 11.0 | 67.0 |
| 25.0 | 15.0 | 60.0 |
| 27.2 | 5.8 | 67.0 |
| 35.0 | 15.0 | 50.0 |
| 35.0 | 10.0 | 55.0 |

The interlayer or substrate precoat (c) usefully consists essentially of a thin platinum film totaling about 0.1–10 microns in thickness, and preferably a film layer of about 0.1–1 micron. For purposes of the present invention, such interlayer or precoat is conveniently applied as a metallo-organic such as a platinum resinate solution, or, alternatively, as a chloroplatinic acid or corresponding platinate solution, dried, and fired to obtain a corresponding metal layer or film. Sputtering, ion plating, electrodeposition, and thermal evaporation techniques are also found useful for applying such a layer.

As above noted, the stability and efficiency of solar collectors are enhanced by the tandem combination of the absorptive film and platinum interlayers. This is particularly apparent in collectors of low film weight, which are transparent in the infrared and thus permit the platinum undercoat to function as a low infrared emitter.

Figure 2:
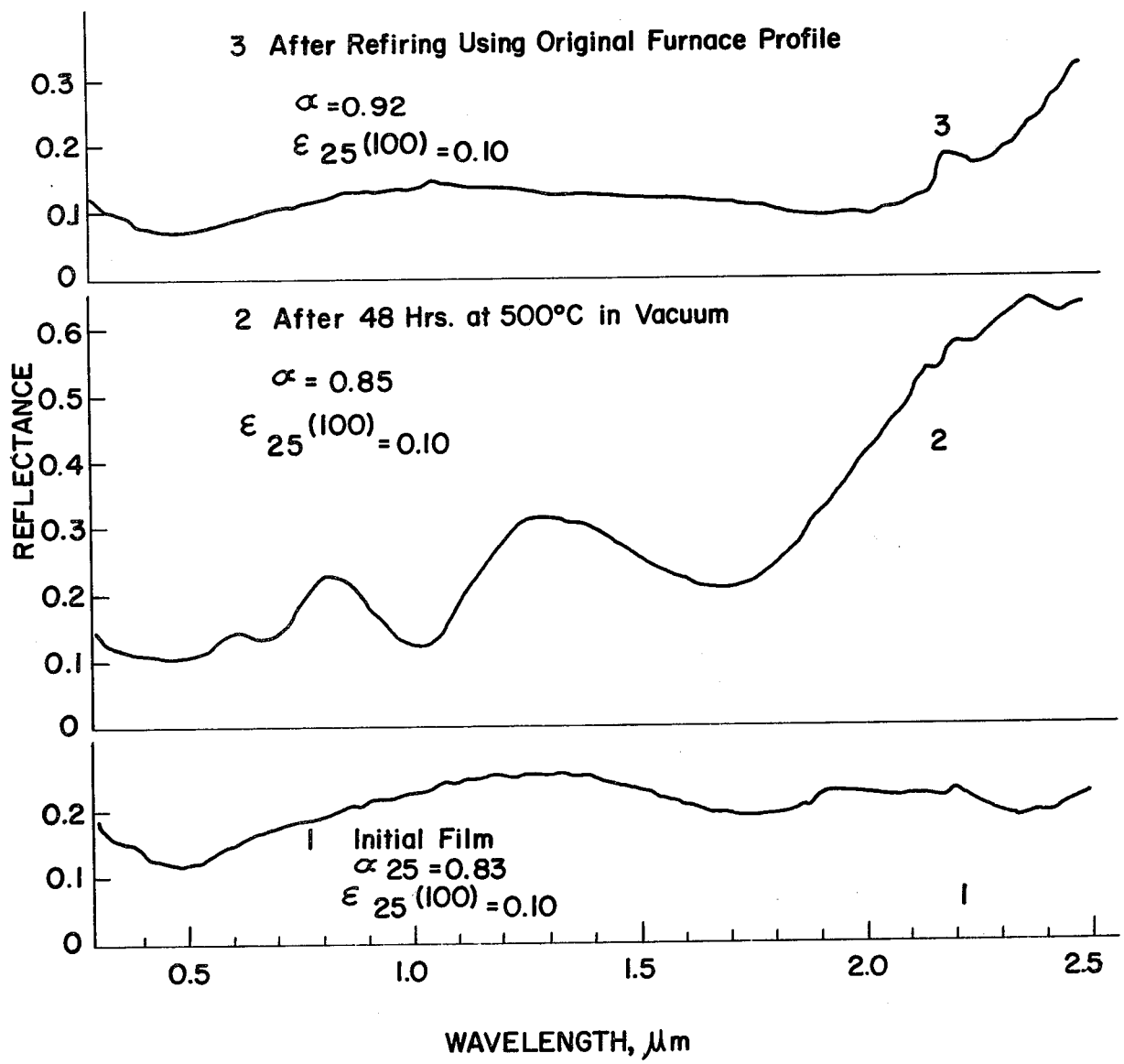
FIG. 2 shows the Reflectance vs. Wavelength of the present invention initially, after 48 hours at 500° C. in a vacuum, and after refiring using original furnace profile.

The stability of a solar absorptive layer of $CuO/CoO/Mn_2O_3$ on platinum-precoated quartz, with respect to thermal aging under air and in vacuum, is illustrated in FIGS. 1–2. On the basis of this information, it is evident that interlayers having a platinum precoat in conjunction with the indicated absorptive layer exhibit unusually good optical stability. The tandem structure formed by the platinum precoat and solar absorber film of the present invention is also found advantageous for stabilizing and maintaining good emittance properties with a negligible effect on absorptivity.

Solar energy collectors of this invention are conveniently obtained by a multiple-coating process, in which a thin platinum precoat film or layer is deposited onto quartz or other defined substrate surface, dried, fired at a temperature up to about 800° C.; and the solar absorptive layer and optional anti-reflective coating thereafter applied.

The present invention also includes a corresponding method for preparing a solar collector of improved thermal stability, particularly under vacuum, by: (A) uniformly depositing a platinum interlayer onto a substrate as above-defined, preferably in the form of a metallo-organic solution, such as a resinate solution, by art-recognized techniques, such as spin coating or spraying; (B) drying and calcining the coated substrate at a temperature up to about 800° C., and preferably within the range of about 400° C.–800° C.; and thereafter, (C) uniformly depositing copper, cobalt and manganese, as mixed metallo-organic solution(s), such as resinate solutions, onto the surface of the platinum-coated substrate, and (D) drying and calcining the coated substrate to obtain the desired collector. As above noted, one or more anti-reflective layer(s), such as cerium oxide or tantalum oxide, can also be included in association with the absorptive layer. Such can also be conveniently applied by spin coating in the form of a metallo-organic (i.e., resinate) solution, dried, and fired in the above manner.

More specifically, collectors of the present invention can be prepared by soaking the substrate in Chromerge ®, or similar cleaning solution, for several minutes at room temperature, then repeatedly rinsed with deionized water, and dried. The substrate is placed on a spin coater and an excess of a 5%–15% platinum resinate solution placed at its center, and rotated at 600–2000 RPM for up to about 15 seconds, to uniformly distribute the resinate solution in the desired thickness over the substrate surface. The substrate is then dried and calcined up to 1 hour at a temperature up to about 800° C. (preferably 400° C.–800° C.), to decompose the resinate and obtain a thin precoat or interlayer of platinum metal on one side, having a uniform thickness within the above-indicated range. Known techniques for application other than spin coating, such as spraying, brushing, roller coating, stamping, screen printing and sputtering, can be used as well, depending upon the substrate employed.

The solar absorptive layer is preferably applied by depositing copper/cobalt/manganese in the form of one or more resinate solutions containing about 5%–15% metal content or compatible mixtures thereof onto the platinum-precoated substrate mounted on a spin coater, and the coater allowed to run for 5–15 seconds at about 600–2000 RPM, depending upon the desired thickness. The substrate is then dried and calcined in air, as before, at a temperature of about 400° C.–800° C. to obtain the (b) absorptive layer. Other means of application known to the art, such as spraying, brushing, roller coating and screen printing, can be used in this step as well.

Figure 3:
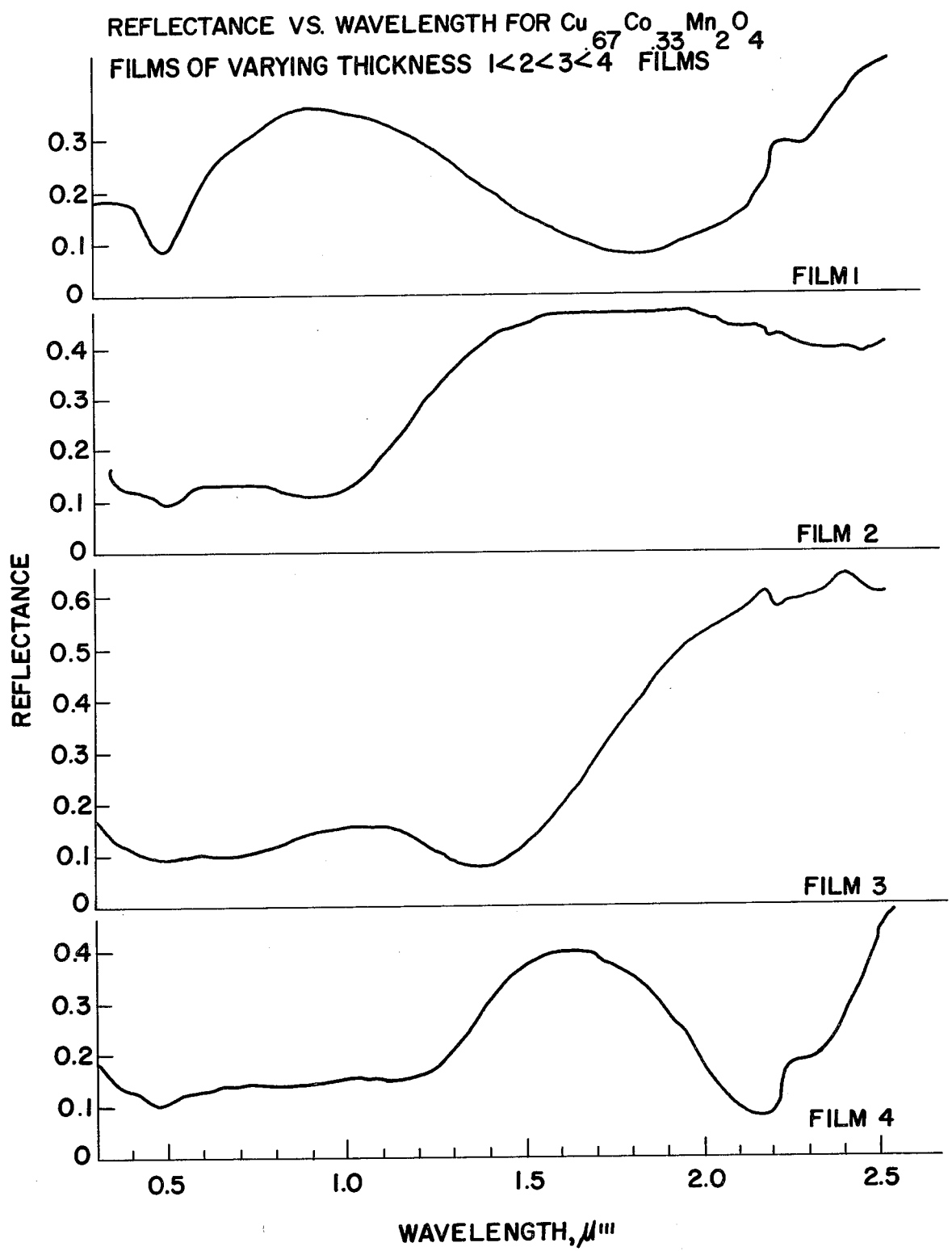
FIG. 3 shows the effect of film thickness on Reflectance vs. Wavelength.

The solar absorptive layer thus obtained (Ref. FIG. 3) can comprise one or a plurality of admixed solutions applied, dried and calcined to have a final combined thickness, up to about 10 microns and preferably within the range of about 0.1–4 micron.

Suitable metallo-organics (i.e., resinate solutions) for depositing various films or layers onto the substrate or as an interlayer or reflective layer, as above described, are conveniently prepared by treating an organic acid or mercaptan with the desired metal salt or combination of metal salts. The resulting product(s) consists of a metal atom bonded to sulphur or oxygen which, in turn, is bonded to carbon. When films formed from such material are fired, the organic portion is burned off to form a corresponding film of metal, metal oxide or cermet.

Certain absorber films possess optimum absorptance at predetermined film thicknesses and, therefore, the relationship between good optical properties and film thickness must be ascertained beforehand, in order to assure reproducibility of results.

Thickness of the solar absorber layer is a function of solution viscosity, including the solids content of the resinate solution, as well as spin coating time and revolution speed. Thus, for example, speeds up to 1200 RPM over a 10 second period have generally resulted in film layers having satisfactory properties.

Assuming constant application conditions, the following formula can be usefully applied:

$$\text{Film Thickness(cm)} = \frac{\text{Weight(g)}}{\text{Density(g/cm}^3\text{)} \times \text{Area(cm}^2\text{)}}$$

so that where density of a film is known, and the weight and area parameters ascertained, it is possible to estimate desirable film thicknesses. Film thickness, in turn, may then be correlated with various optical properties to obtain a class of solar collectors.

Wavelength vs reflectance (and absorptance) properties are also correlated to film thickness (see FIG. 3). The optical properties (i.e. reflectance) is a function of the formula $$\frac{\cos 4 \pi n, d}{\lambda}$$

where n, is the index of refraction of the film and d is the film thickness. Thus, as "d" increases, the maxima and minima are moved to higher wavelengths. Absorption films, such as those deposited over a $CeO_2$ or similar precoat on quartz, however, do not appear to demonstrate the relationship in comparable temperature ranges.

As above noted, the solar collectors of this invention include, as an optional feature, the use of anti-reflective coatings, such as metal oxides, inclusive of cerium oxide and tantalum oxide. Such coating(s) is conveniently applied to the surface of the absorptive film using a spin coating process which is essentially identical to the procedure herein described for depositing platinum onto the surface of quartz, silicate glass, or metal substrates. The use of such anti-reflective coating(s) serve(s) mainly to enhance the efficiency of the collector.

This invention is further described in detail by reference to specific embodiments, however, it is to be understood that such embodiments are presented for illustration and are not intended to be limitative of the invention as otherwise described herein.

EXAMPLE 1: ABSORBER FILM ON PLATINUM-COATED QUARTZ SUBSTRATE

STEP A: Platinum-Coated Quartz.

A 1¾ inch diameter circular quartz coupon is coated by placing it on the vacuum chuck of a spin coater and a 9% platinum resinate solution deposited, in excess, on its center, After operating the coater for 10 seconds at 1200 RPM, the coupon is dried at 125° C. for 30 minutes and calcined in air at a temperature of 550° C. for a period of 5 minutes. The resulting substrates possess a platinum precoat having a thickness of about 0.2 micron.

STEP B: The platinum-coated quartz coupon from Step A is again mounted on a spin coater; mixed 9% resinate solution (c) of copper, cobalt and manganese are deposited in excess on the coupon surface, and the coater operated at 800 RPM for 10 seconds to evenly distribute the solution. The coated substrate is air dried at 125° C. for 30 minutes, and calcined for 5 minutes at 550° C. to obtain an absorptive layer having a uniform thickness of about 1.0 micron. The composition of the absorptive layer is found to coincide with the formula $Cu_{67}Co_{0.33}Mn_2O_4$.

The test coupon of Steps A and B is thermally aged for seven hundred (700) hours at 500° C., cooled and evaluated, the test results being reported in Table II and represented in FIG. I.

The solar absorptance ($\alpha_{25}$) and reflectance data are obtained at 25° C. by using a Cary Model 14 Commercial Spectrophotometer, solar absorptance ($\alpha$) being calculated from hemispherical reflectance data by numerical integration of the following equation:

$$-(\alpha_{25}) = \int_{0.35}^{2.5} (1 - R_{25}(\lambda)) F_{AM2}(\lambda) d\lambda$$

where $\lambda$ represents the wavelength of incident light, $R_{25}$ is the hemispherical reflectance measured at 25° C. and $F_{AM2}(\lambda)$ is the fraction of solar irradiance at air mass two (AM2) in the wavelength region $d\lambda$. The $F_{AM2}(\lambda)$ needed to determine absorptance ($\alpha_{25}$) is reported in "The Proceedings of D.O.E./D.S.T. Thermal Power System Workshop on Selective Absorber Coatings", authored by J. C. Richmond of the Solar Energy Research Institute, Golden, Colo. (1977).

Auger analyses of the test coupon confirms the presence of a graded composite structure with a metal phase concentrated at the substrate surface and the oxide phase concentrated at the opposite side.

The improved stability, as demonstrated through the optical properties of the absorption layer, is further demonstrated in Example 2, in which three quartz substrates are coated in an identical manner, except for length of spin coating time, leading to variation in thickness of the solar absorptive (b) layer. (ref. FIG. 3)

TABLE II

| | (Ref. FIG. 1) | |
|---|---|---|
| $\lambda$ | Initial Reflectance | Reflectance* After Aging |
| 0.5 | .10 | .10 |
| 0.6 | .09+ | .12+ |
| 0.7 | .11 | .12 |
| 0.8 | .12 | .13 |
| 0.9 | .15 | .16+ |
| 1.0 | .15+ | .18 |
| 1.1 | .14+ | .16 |
| 1.2 | .12 | .12 |

TABLE II-continued
(Ref. FIG. 1)

| λ | Initial Reflectance | Reflectance* After Aging |
|---|---|---|
| 1.3 | .10 | .07 |
| 1.4 | .08 | .07 |
| 1.5 | .11+ | .15 |
| 1.6 | .20 | .24 |
| 1.8 | .37 | .43 |
| 2.0 | .52 | .56 |
| 2.2 | .59 | .63 |
| 2.3 | .58+ | .61 |
| 2.4 | .62+ | .64+ |
| 2.5 | .58 | .60 |

*Aged at 500° C. for 700 hours in air.

EXAMPLE 2: PLATINUM PRECOAT ON QUARTZ SUBSTRATE

STEP A:

Three (3) clean quartz coupons, identical to those used in Example 1, are individually mounted on a spin coater and 9% platinum resinate solution deposited thereon in identical amounts and mounted on a spin coater, operated for 10 seconds at 1000 RPM to apply a uniform platinum-resinate coating on each coupon.

The coupons are then identically dried and calcined in air at a temperature of about 550° C. for 5 minutes to convert the platinum resinate to a platinum precoat layer of about 0.25 micron thickness.

STEP B:

A 9% combined resinate solution of copper, cobalt and manganese, identical in amount and kind to that used in Example 1, is deposited onto each of the three platinum-coated coupons of Step A and spin coated, the speed for each sample being adjusted upwards at 900-1050-1200 RPM, respectively, to obtain progressively thinner absorptive layers, but containing the same proportion of metals. The three test coupons (identified as films #1, #2 and #3) are then dried and calcined as described in Step B of Example 1. The test coupons are found to have absorptive coatings approximating the formula $Cu_{0.67}.Co_{0.33}.Mn_2O_4$, but differing from each other and from Example 1 test coupon with respect to reflectance (and $\alpha_{25}$) values from 0.3-2.5 microns. The results are reported in Table II and demonstrated in FIG. 2.

The reflectance values are measured as a function of the previously-noted formula $$\cos \frac{4\pi n_1 d}{n}$$

wherein "$n_1$" is the index of refraction of the film and "d" represents film thickness. All films exhibited absorptance values ($\alpha_{25}$) ranging from 0.88-0.92 and thermal emissivities ($\xi_{25}(100)$) ranging from 0.06-0.12. On the basis of these studies, it was concluded that absorptance ($\alpha_{25}$) is dependent upon the position of the interference Maxima and minima, and that an increase in film thickness (d), results in a concomitant movement of said maxima and minima to higher wavelengths.

EXAMPLE 3: PLATINUM PRECOATED FECRALLOY

STEP A:

A clean Fecralloy test coupon is mounted on the vacuum chuck of a spin coater, and an excess of 9% platinum resinate solution placed at its rotational center. The coater is spun for 10 seconds at 1200 RPM and the coupon dried and calcined according to the procedure described in Step A of Example 1, to obtain an evenly distributed platinum precoat film of about 0.2 micron thickness.

STEP B:

The platinum-coated coupon obtained according to Step A is again placed on a spin coater and a mixed Cu/Co/Mn 9% resinate solution placed on its rotational center. The coater is then spun for 11 seconds at 1000 RPM and the coupon dried and calcined at 550° C. for 5 minutes as in Example 1, to obtain an absorptive layer of the general formula $Cu_{0.67}.Co_{0.33}.Mn_2O_4$ and a thickness of about 1.2 micron.

The resulting coupon is tested and (ξ) found to be relatively low in a λ range of 2.0-20 microns with relatively high (α) over a (λ) range of about 0.35-2.0 micron.

What is claimed is:

1. A solar energy collector comprising, in combination
   (a) a substrate component selected from the group consisting of quartz, silicate glass, and a stainless steel;
   (b) a solar absorptive layer consisting essentially of an oxide mixture of copper, cobalt and manganese; over
   (c) an interlayer comprising platinum in contact with said solar absorptive layer and said substrate.

2. A solar collector of claim 1 in which the (b) solar absorptive layer has at least one anti-reflective coating.

3. The solar collector of claim 2 in which the anti-reflective coating comprises cerium oxide or tantalum oxide.

4. The solar collector of claim 1 wherein the (b) solar absorptive layer contains about 15%-35% by weight of a copper oxide, 5%-15% by weight of a cobalt oxide and 50%-80% by weight of a manganese oxide.

5. The solar collector of claim 1 wherein the (b) solar absorptive layer contains about 15%-35% by weight CuO, 10%-15% by weight CoO and 50%-75% by weight $Mn_2O_3$.

6. The solar collector of claim 2 wherein the (b) component contains about 15%-35% by weight CuO, 5%-15% by weight CoO, and 60%-75% by weight $Mn_2O_3$.

7. The solar collector of claim 1 wherein the (c) interlayer consists essentially of a thin platinum film.

8. The solar collector of claim 7 wherein the thickness of the platinum interlayer is about 0.1-1 micron.

9. The solar collector of claim 4 wherein the thickness of the absorptive layer is about 0.1-4 micron.

10. The solar collector of claim 4 wherein the substrate component is quartz.

11. The solar collector of claim 4 wherein the substrate component is a stainless steel.

12. The solar collector of claim 4 wherein the substrate component is a silicate glass.

13. A method for preparing a solar energy collector of improved thermal stability, which comprises:
   (A) uniformly depositing a platinum-interlayer onto a substrate selected from the group consisting of quartz, silicate glass, and stainless steel;
   (B) drying and calcining the coated substrate;
   (C) uniformly depositing a mixture consisting essentially of copper, cobalt and manganese onto the surface of the platinum-coated substrate; and (D) drying and calcining the coated substrate to obtain the desired collector.

14. The method of claim 13 wherein one or more antireflective layers are added as part of the absorptive layer.

15. The method according to claim 13 wherein said platinum film is applied as a single thin layer by spin coating a resinate solution of platinum deposited onto the surface of said substrate.

16. The method according to claim 13 wherein said absorptive film is deposited in the form of a single layer by spin coating one or more resinate solutions onto the surface of said substrate, dried and calcined.

* * * * *